United States Patent [19]

Tenace et al.

[11] Patent Number: 4,781,806
[45] Date of Patent: Nov. 1, 1988

[54] ELECTROPLATING SYSTEM

[75] Inventors: Dominic Tenace, 15980 Grand Ave., #M-9, Lake Elsinore, Calif. 92330; Donald M. Hutchison, Moreno Valley, Calif.

[73] Assignee: Dominic Tenace, Lake Elsinore, Calif.

[21] Appl. No.: 59,213

[22] Filed: Jun. 8, 1987

Related U.S. Application Data

[63] Continuation of Ser. No. 786,472, Oct. 11, 1985, abandoned.

[51] Int. Cl.[4] .......................... C02F 1/46; C25D 21/08
[52] U.S. Cl. ..................................... 204/149; 204/232; 204/240; 204/DIG. 13
[58] Field of Search ............... 204/232, 237, 238, 239, 204/240, 149, 152, DIG. 13

[56] References Cited

U.S. PATENT DOCUMENTS

| 3,640,331 | 2/1972 | Yagishita | 204/DIG. 13 |
|---|---|---|---|
| 3,658,470 | 4/1972 | Zievers et al. | 204/DIG. 13 |
| 3,661,732 | 5/1972 | Withrow | 204/232 X |
| 3,826,718 | 7/1974 | Takayasu | 204/232 X |
| 3,973,987 | 8/1976 | Hewitt | 204/238 X |
| 3,979,220 | 9/1976 | Ishiyama et al. | 204/232 X |
| 4,157,942 | 6/1979 | Tuznik et al. | 204/238 X |
| 4,561,956 | 12/1985 | Antonelli | 204/232 |
| 4,592,819 | 6/1986 | Suzuki et al. | 204/DIG. 13 X |
| 4,595,474 | 6/1986 | Greco | 204/232 |
| 4,613,412 | 9/1986 | MacDermid | 204/DIG. 13 |

FOREIGN PATENT DOCUMENTS

| 0132719 | 2/1985 | European Pat. Off. | 204/DIG. 13 |
|---|---|---|---|
| 2729270 | 1/1979 | Fed. Rep. of Germany | 204/DIG. 13 |
| 0024929 | 2/1980 | Japan | 204/DIG. 13 |

Primary Examiner—Donald R. Valentine
Attorney, Agent, or Firm—Leonard Tachner

[57] ABSTRACT

An electroplating system with improved water use efficiency and unique waste water treatment which enables operation without access to public sewers thereby permitting compliance with governmental regulations regarding disposal of waste water. Water use efficiency is achieved by means of limited use of overhead water sprays, multiple rinse tank backflow to the prior process tank and water evaporation from said process tanks. In addition, all waste water not returned to the prior process tank locally at each plating subassembly is transferred to an inplant sump for common evaporative treatment.

5 Claims, 3 Drawing Sheets

COPPER-BRASS SUBASSEMBLY

STRIP LINE SUBASSEMBLY

ELECTROPLATING SYSTEM

This is a continuation of parent application Ser. No. 786,472 filed Oct. 11, 1985, now abandoned.

BACKGROUND OF THE INVENTION

1. Field of the Invention

The present invention relates generally to the field of electroplating systems and more specifically, to an electroplating system designed to operate without access to public sewers.

2. Prior Art

With the plethora of state and federal regulations on control of toxic materials in waste water, it has become incumbent on plating enterprises to control the level of materials such as cyanide, heavy metals and the like in waste water leaving a plant. The source of the vast majority of this waste water is the rinse water used between the various steps in the plating procedure. Typically, the simplist plating cycles require three steps. These include cleaning to remove such soils as buffing compounds, stamping or cutting lubricants and the like; an acid dip to remove metal oxides, often called pickling; and finally, electroplating with one or more metals. Upon withdrawal of parts from each of the processing tanks used in the aforementioned plating steps, the parts to be plated are covered with a film of the processing solution commonly referred to as dragout. This material is invariably a contaminant to the following process tank and must be removed by water rinsing before the parts enter the following process tank. These rinses must be constantly overflowed with clean or cleaner water to prevent buildup in the levels of process tank constituents so that contamination of the following process tank does not result. Therefore, a major problem in controlling plant effluent is the control of quantity and content of the rinse waters that are generated in the plating sequence.

The present invention solves this problem by improving rinsing efficiency while minimizing water requirements. Rinsing efficiency is improved by providing air agitation in the rinse tank to ensue that the dragout film is diluted to the maximum extent consistent with the rinse volume and the amount of dragin. In addition, the invention provides sprays over each tank which is active during withdrawal of the part or workpiece. This further dilutes the dragout film and provides fresh water to prevent excessive buildup of the contaminants in the rinse water. Typically, the volume of water through a single rinse tank has to be rather high to keep the contaminants in the rinse water at a sufficiently low level to be tolerated in the following process tank. The present invention significantly reduces the amount of water by multiple rinses. For example, it can be seen in a series of three consecutive rinses that each rinse would be cleaner than the rinse ahead of it. This makes it feasible to "backflow" the water from the third to the second to the first rinse in each tank. As a result, the incoming water is significantly cleaner than the contaminant level in the tank. The contaminants in the rinse waters are the constituents of the previous process tank. It is therefore feasible to return water to a previous process tank.

The use of multiple rinses is one means for reducing the volume of rinse water, but ordinarily in most cases, the rinse water volume is still more than that which can be returned to the process tank. The present invention makes room in the process tank for these rinse waters by using an evaporator consisting of a device for pumping the solution continuously through a chamber designed to provide maximum surface area for liquid. At the same time a blower provides maximum air flow through the chamber which results in a significant amount of evaporation and makes room in the tank for the return of backflow rinse water from the sequence of tanks.

Although there are prior art patents which disclose some of the individual features of the present invention, no patents have been found which disclose the specific combination of features which permit operation of a plating system without access to public sewers.

U.S. Pat. No. 2,984,081 to Hahn is directed to the cooling of chromium plating solution and provides for a plating solution tank in which fluid is passed through a conduit into an evaporator.

U.S. Pat. No. 3,616,437 to Yagishita is directed to a system for reclaiming plating wastes wherein a liquid rinse water is brought into a tower where it is heated by steam in order to partially vaporize it. The vapor is then passed to an ejector where it is introduced into cooling water to be condensed and then brought to a reservoir.

U.S. Pat. No. 3,637,467 to Spatz is directed to a metal reclamation process and system which uses a primary rinse tank and a secondary rinse tank. Liquid is drawn off through a conduit and passed to a pump where it is brought into a reverse osmosis unit, the concentrate of which passes back to the plating tank and wherein permeate is brought through a conduit back to the primary rinse tank.

U.S. Pat. No. 4,197,167 to Wright Jr. is directed to a process for recovery and reuse of metal electroplating baths. The system includes a reservoir which is supplied with a portion of the rinse mixture from a tank. Acid is added to the rinse mixture in the reservoir and the rinse and acid mixture is then recirculated through filters and back to the reservoir.

U.S. Pat. No. 3,146,195 to Berardi is directed to purification of water in a lobster tank wherein the force of water coming out of the tube provides an aspirating action and draws air through the air tube and mixes the air with purified water issuing from the tube. The mixture of water and air is projected out of the end of the submerged tube.

U.S. Pat. No. 2,773,029 to Sebald is directed to a water treating system in which water is led to a primary water softener through a water conduit which is connected to spray valves disposed at the upper end of the softener.

None of these patents discloses a system which may operated efficiently without any access at all to public sewers for the disposal of the waste produced by an electroplating system.

SUMMARY OF THE INVENTION

The present invention comprises a plating system which can be operated without access to public sewers. It comprises four principal subsystems including a nickel-chrome plating subsystem, a copper-brass plating subsystem, a strip line subsystem and a waste water treatment subsystem. In the nickel-chrome subsystem, the only waste water produced is the rinse after an acid dip which is disposed of in an inplant sump. Three backflow rinse cycles are provided, one for the cleaning operation, one for the nickel plating operation and one for the chrome plating operation. The number of rinses in each cycle varies as the tolerance for the dragover into the following process tank varies in each case. Clean water is added to each of the last rinses from an overhead spray on a hoist which operates only on the withdrawal of parts from the last rinse. The second subassembly, namely, the copper-brass line is typically used for work limited to small parts on an intermittent basis. In order to minimize rinse water carry-over, thereby keeping rinse water requirements to minimum, a hang-up bar is provided over each plating tank and each rinse tank. This hang-up bar allows parts to drain thoroughly and reduces the carry-over to the following tank. Backflow water generated by two rinsed progresses through a separate tank for destruction of the cyanide content of the solution by chemical oxidation accomplished by controlled addition of sodium hypochlorite. An air-water spray wand is used over the second rinse tank. The backflow water is then transferred to an inplant sump for waste water evaporation after treatment in a neutralization sump.

The strip line assembly employs tanks which are used intermittently for stripping plated metal from parts that are to be replated. Hang-up bars are provided over each strip tank and each rinse tank to assure good drainage of parts. A wand consisting of a water spray with air atomization is provided for rinsing with clean water over the rinse tank. The rinses are also overflowed to the water evaporation tank.

The waste water treatment subassembly is connected by means of an inplant sump to the other subassemblies from which waste water is received. The waste water from the three other subassemblies enters the inplant sump and is eventually transferred to a neutralizer sump. The waste water pH level is adjusted to 7.0 to 8.0 and then it progresses through a sump pump to an evaporator tank. The amount of rinse water is held to an absolute minimum in each subsystem. The contaminants in the waste waters are primarily heavy metal which after cyanide destruction to break the copper and brass complex, precipitate as metal hydrates. The waste water treatment subsystem employs a continuously operating sludge filter to remove these metal hydrates along with silicates precipitated from spent cleaners during neutralization. Sulfates are precipitated by the addition of calculated amounts of lime. An evaporator tank is maintained at a sufficiently high temperature to promote evaporation and is run continuously. The sludge is accummulated as a dewatered cake and is oven dried to further reduce water content. This cake can then be accummulated and removed to a Class A landfill at periodic intervals.

OBJECTS OF THE INVENTION

It is therefore a principal object of the present invention to provide a plating system capable of nickel-chrome plating, copper-brass plating and plate stripping without requiring access to public sewers.

It is an additional object of the present invention to provide an apparatus for accomplishing the typical plating processes in which the quantity and content of rinse waters used in the plating sequence are carefully controlled to preclude a necessity for access to public sewers for disposing of the waste water.

It is still an additional object of the present invention to provide a novel electroplating facility and waste water treatment combination which permits normal plating and stripping operations in such a facility without generating waste rinse water which must be otherwise disposed of in a public sewage system.

It is an additional object of the present invention to provide an apparatus for accomplishing typical metal plating processes in which the quantity and content of rinse waters in the plating sequence are carefully controlled to preclude a necessity for having access to public sewers for disposing of the waste rinse waters used between the various steps in the plating procedure.

It is still an additional object of the present invention to provide a metal plating facility comprising subassemblies for nickel-chrome plating, copper-brass plating and plate stripping while at the same time recovering waste waters used for rinsing in the various subassemblies in a common waste water treatment subassembly which permits treatment and disposal of waste water effluents without requiring sewage disposal which might fall outside of the disposal regulations of federal, state and local agencies.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings.

DETAILED DESCRIPTION OF A PREFERRED EMBODIMENT

Figure 1:
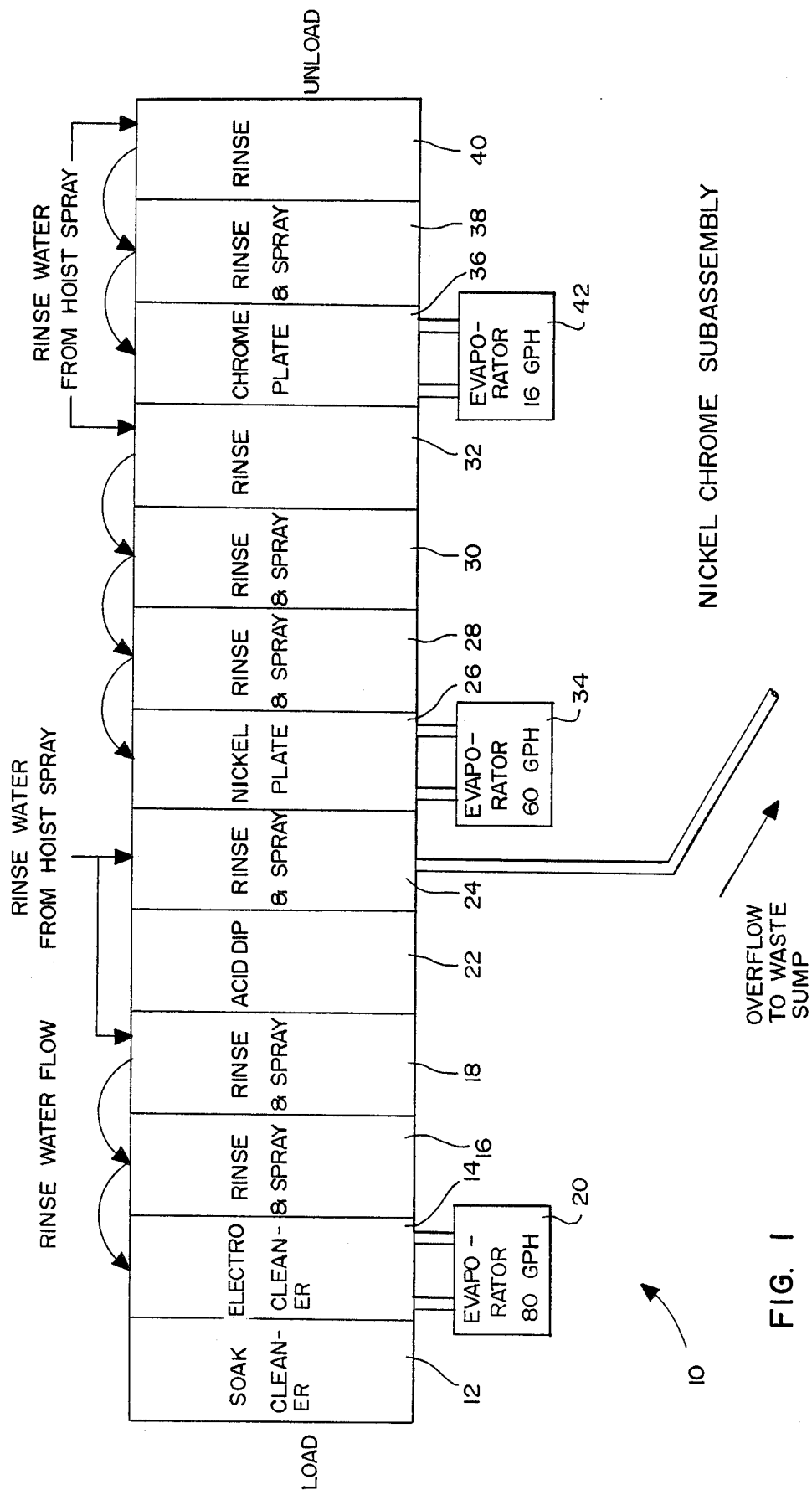
FIG. 1 is a block diagram representation of the nickel-chrome plating subassembly of the present invention.

Reference will first be made to FIG. 1 which illustrates the nickel-chrome plating subassembly of the present invention. Each separate rectangle represents a functional operation of the nickel-chrome plating sequence used in the present invention and also represents a tank which constitutes a portion of the subassembly apparatus for accomplishing the method of the present invention. Metal parts to be plated are loaded on the left side of the subassembly and placed in the first tank 12 which comprises a soak cleaner for removing caked-on dirt from the parts to be plated as well as such soils as buffing compounds, stamping or cutting lubricants and the like. The parts are subsequently placed in an electrocleaner 14 for further removal of organic materials. Generally speaking, the purpose of the soak cleaning and electrocleaning tanks 12 and 14 is to dislodge all foreign materials on the parts to be electroplated.

The next two tanks in the sequence of nickel-chrome subassembly 10 are rinse and spray tanks 16 and 18. Upon the withdrawal of parts from each of the processing tanks, the parts to be plated are covered with a film of the processing solution, commonly referred to as dragout. This material is invariably a contaminant to the following process tank and must be removed by water rinsing before the parts enter the following process tank. These rinses must be constantly overflowed with clear or cleaner water to prevent buildup in the levels of process tank constituents, otherwise contamination of the following process tank will result. In order to make the rinsing efficiency high while reducing the water requirements, each rinse tank is provided with a source of air agitation to ensure that the dragout film is diluted to the maximum consistent with the rinse volume and the amount of dragin. Furthermore, overhead sprays are provided in some cases and these sprays are active over the tank during withdrawal of the part. This further dilutes the dragout film and provides fresh water to prevent excessive buildup of contaminants in the rinse water. In the present invention the amount of water used for rinses is greatly reduced by utilizing multiple rinses. By way of example, it can be seen that in a series of three times, each rinse would be cleaner than the rinse ahead of it. This makes it feasible to backflow the water for example, from a third rinse to a preceding second rinse and in turn to a preceding first rinse, in a series of three rinse tanks. As a result, the incoming water in each tank is significantly cleaner than the contaminant level in that particular tank. To illustrate, in a rinse sequence which would normally require 27 gallons of water an hour in a single rinse to keep contaminants at an acceptable level, a double rinse would require only 9 gallons per hour and a triple rinse would require only 3 gallons per hour.

It can be understood from the above discussion that the so called "contaminants" in the rinse waters are the necessary constituents of the previous process tank. It is therefore feasible to return that water to the previous process tank, and reducing the volume of rinse water by using multiple rinses is one of the features of the present invention that renders it possible to preclude the need for access to public sewers. This multiple rinsing and backflow technique is utilized in the nickel-chrome subassembly of FIG. 1. More specifically, as seen in FIG. 1, the cleaner rinse water of tank 18 is backflowed to the more contaminated rinse water of tank 16 which is in turn backflowed to the even more contaminated solution of electrocleaner tank 14. In order to permit the backflow process and still leave room in the process tank for these rinse waters, an evaporator is used at critical points in the process of each subassembly. For example, in the subassembly of FIG. 1 an 80 gallon per hour evaporator unit 20 is connected to electrocleaner 14. Evaporator 20 comprises a device for pumping the solution of electrocleaner tank 14 continuously through a chamber designed to provide maximum area for the liquid. At the same time a blower provides maximum air flow through the chamber and combined with the surface area of the chamber, provides the level of evaporation required for that particular processing tank. The back water flow from rinse tank 18 is replenished by rinse water from an overhead hoist spray which remains active during withdrawal of the work. The hoist spray dilutes the dragout film and provides fresh water to prevent excessive buildup of the contaminants in the rinse water.

Figure 4:
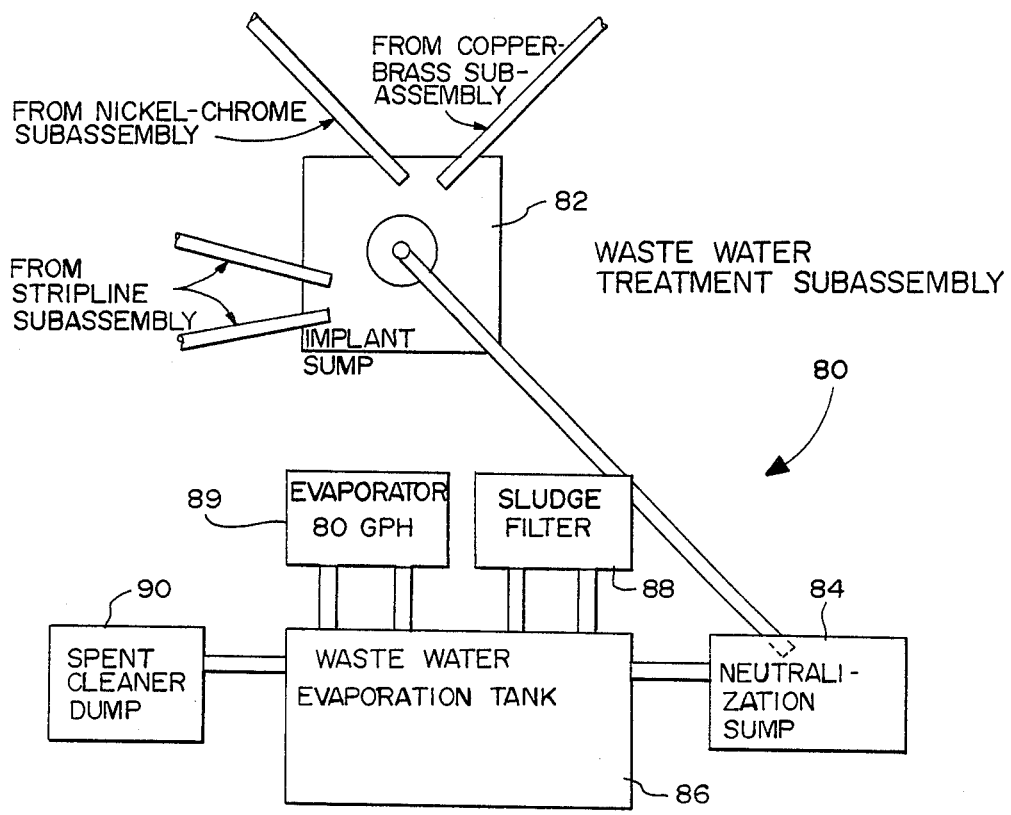
FIG. 4 is a block diagram representation of the water water treatment subassembly of the present invention.

After the part to be plated is removed from electrocleaner 14, it is placed in rinse tank 16 and subsequently in rinse tank 18. Thereafter it is placed in an acid dip tank 22. The acid dip process, often called pickling, is designed to remove metal oxides from the part. It also removes rust, scale and other inorganic coatings that still adhere to the metal after the soak and electrocleaning processes are completed. After the part is removed from the acid dip tank 22 it is transferred to the rinse and spray tank 24. Rinse and spray tank 24 is the only tank in the nickel-chrome subassembly which produces waste water in the form of an overflow which is transferred to the waste sump of the waste water treatment subassembly to be discussed hereinafter in conjunction with FIG. 4. The water in rinse and spray tank 24 is replenished by the overhead rinse water from the hoist spray above the tank which also keeps the level of contaminants in rinse and spray tank 24 to a minimum.

Rinse and spray tank 24 completes the portion of the nickel-chrome subassembly 10 which is devoted to cleaning the part to be plated. The part is next transferred to the nickel-chrome tank 26. The backflow process previously described in conjunction with rinse and spray tanks 16 and 18 and electrocleaner tank 14 is again employed in the nickel plating portion of the nickel-chrome subassembly. More specifically as seen in FIG. 1, the nickel plating tank 26 is followed by three water cleaning tanks, namely, rinse and spray tank 28, rinse and spray tank 30 and rinse tank 32. Rinse tank 32, which has the lowest level of contaminants of the three rinse tanks following the nickel plate tank 26, has its water constantly replenished by rinse water applied from the overhead hoist spray. The overflow from rinse tank 32 is backflowed into rinse and spray tank 30 and the overflow from rinse and spray tank 30 is backflowed into rinse and spray tank 28. Finally, the overflow from rinse and spray tank 28 is backflowed into the nickel plating tank 26 which is connected to an evaporator 34 which operates in the same manner as previously described for evaporator 20. In this particular embodiment, the evaporator 34 has a 60 gallon per hour capacity. The number of rinses in each cycle varies as the tolerance for the dragover to the following process tank varies in each case. The clean water added to each of the last rinses comes from a spray on the hoist which operates only on the withdrawal of the parts from the last rinse. This relates the rinse water volume directly to the number of parts being processed.

When the nickel plating process is used as an undercoating for chromium plating, the parts that are removed from rinse tank 32 are thereafter placed in the chrome plating tank 36 which employs a two-stage rinsing process represented by rinse and spray tank 38 and rinse tank 40. The rinse water in rinse tank 40 is replenished by the overhead hoist spray and the overflow is channeled to the rinse and spray tank 38. The overflow from rinse and spray tank 38 is channeled back to the chrome plate tank 36 and the overflow from chrome plate tank 36 is disposed of in evaporator 42 which in the particular embodiment illustrated, has a 16 gallon per hour capacity.

In the case of tubular or other hollow parts, the spray rinses are effective only on the outside surfaces of the work. Therefore, it is preferable to double dip these parts in rinses with sufficient time between these dips to allow complete drainage. This ensures maximum possible dilution of the dragin of the process solution which is carried by the parts. Return of the dragout to each of the process tanks can result in the buildup of impurities in the process tanks. However, methods are available to control the level of these impurities in the process tanks. For example, organic impurities in the nickel plating tank are controlled by continuous activated carbon filtration and metallic impurities can be controlled by high pH filtration or by low current density electrolytic purifications. Similar steps are employed to control the level of impurities in the trivalent chrome solution of chrome plating tank 36. The cleaning portion of subassembly 10 accummulates soils which fall into two classes, solids which settle into the bottom of the tank and oils and greases which float on the surface of the tank. Surface contaminants are removed by periodic skimming of the tank and solids are removed when the spent solution is removed to the sump tank for disposal as hereinafter described.

Figure 2:
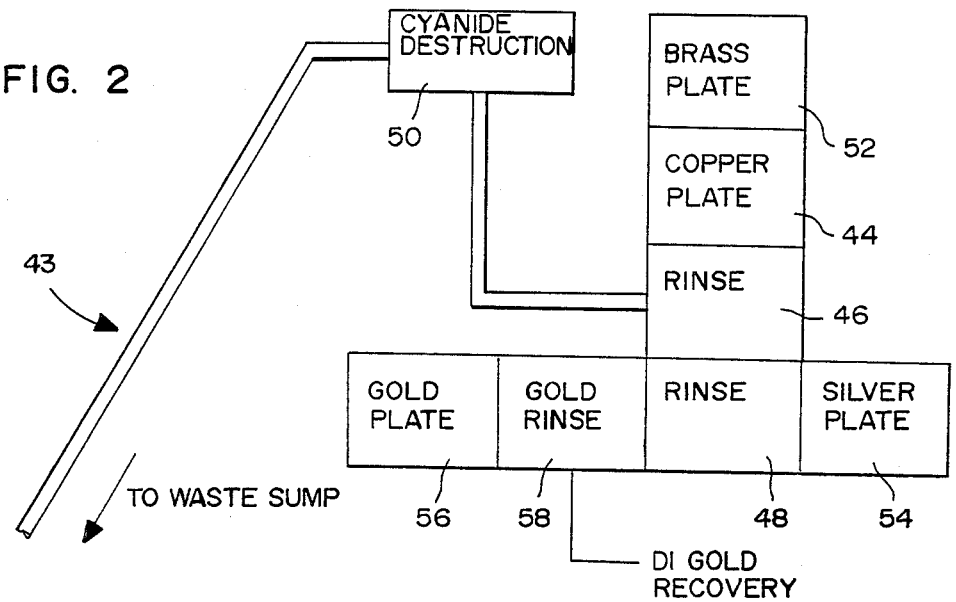
FIG. 2 is a block diagram representation of the copper-brass plating subassembly of the present invention.

Reference will now be made to FIG. 2 which illustrates the copper-brass subassembly of the present invention. Plating in the copper-brass subassembly is typically limited to small parts on an intermittent basis. Therefore the cost of evaporating the brass tank and the copper tank and providing separate rinse cycles is not generally justified. These rinses therefore are run continuously while work is in process. In order to minimize carry-over thereby keeping rinse water requirements to a minimum, a hang-up bar is provided over each plating tank and each rinse tank. This allows the parts to drain thoroughly and reduces the carry-over into the following tanks. Parts to be copper or brass plated or gold and silver plated are transferred to the copper-brass subassembly, typically from the rinse and spray tank 24 of the nickel-chrome subassembly. Thus, for example, a part which is to be copper plated either as an external plating layer or as an undercoating for other metal plating, is transferred to copper plate tank 44. After the copper plating process has been completed, the part is transferred to the rinse tank 46 and then rinse tank 48.

The backflow process for reducing contaminants is provided in the copper-brass subassembly between rinse tank 48 and rinse tank 46. After backflowing through two rinses, the water progresses through a separate tank 50 for destruction of the cyanide content of the solution. This chemical oxidation is accomplished by controlled addition of sodium hypochlorite. The overflow water is then transferred to the waste water treatment subassembly through the inplant sump to be described hereinafter in conjunction with FIG. 4. Brass plating may also be accomplished by means of brass plate tank 52, silver plating is accomplished in silver plate tank 54 and gold plating is accomplished in gold plate tank 56. Because of the value of the metal involved in the gold plating process, the gold plated parts are transferred first to a gold rinse tank 58 from which dissolved gold can be recovered prior to transferring the parts to rinse tank 46 and rinse tank 48 as previously described. An air-water spray wand is used over the second rinse tank.

Figure 3:
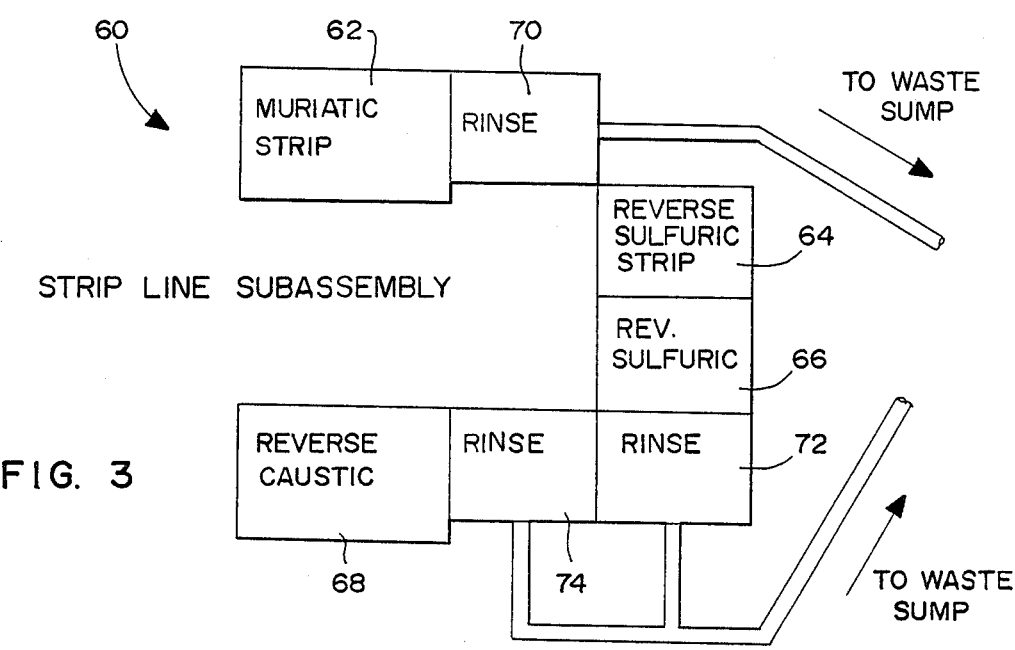
FIG. 3 is a block representation of the strip line subassembly of the present invention.

The strip line subassembly of the present invention is shown in FIG. 3. The tanks in this line are used intermittently for stripping plated metal from rejects or from worn parts that are to be replated. Therefore, it is not usually economically feasible to provide evaporators or multiple rinses for each tank in this subassembly. Accordingly, hang-up bars are provided over each tank and each rinse tank to ensure good drainage of the parts. A wand consisting of a water spray with air atomization is provided for rinsing with clean water over the rinse tank. The methods for stripping previously plated parts for replating vary with the metal to be stripped. Some methods involve purely chemical reactions and some involve making the part anodic in a process that is substantially the reverse of the electroplating process. Thus, strip line subassembly 60 of FIG. 3 is provided with a muriatic strip tank 62, a pair of reverse sulfuric strip tanks 64 and 66 and a reverse caustic strip tank 68. In addition, three rinse tanks are provided including rinse tank 70, rinse tank 72 and rinse tank 74. Rinse tank 70 is used primarily for rinsing the part after muriatic strip treatment and rinse tanks 72 and 74 are employed to rinse the part after reverse treatment in either reverse sulfuric strip tanks 64 and 66 or reverse caustic tank 68. Rinse tank 72 and 74 employ the previously described backflow process similar to that employed in nickel-chrome subassembly 10 of FIG. 1. Each rinse tank is connected to appropriate plumbing for channeling the waste water to the inplant waste sump of the waste water treatment subassembly of FIG. 4 which will now be described.

Waste water treatment subassembly 80 comprises an inplant sump 82, a neutralization sump 84 and a waste water evaporation tank 86 to which is connected a sludge filter 88 and an evaporator 89 and a spent cleaner dump 90. All of the various rinses described in conjunction with the subassemblies of FIGS. 1, 2 and 3 are overflowed through the inplant sump 82 and neutralization sump 84 to water evaporation tank 86. Inplant sump 82 collects the waste water from all of the subassemblies and pumps it to the neutralization sump 84. Neutralization sump 84 adjusts the pH level of the waste water so that it is within the range 7.0 to 7.5. Then a pump transfers the neutralized waste water to waste water evaporation tank 86. The amount of rinse water is held to an absolute minimum by the methods described above in conjunction with FIGS. 1, 2 and 3. The contaminants in these waters will typically be primarily heavy metals while the output of cyanide destruction tank 50 of subassembly 43 of FIG. 2, which breaks the copper and brass complex, precipitates contaminants as metal hydrates. Spent cleaner dump 90 is utilized to collect the spent cleaners during neutralization. A continuously operational sludge filter 88 removes the heavy metals, metal hydrate along with silicates precipitated from spent cleaners during neutralization. Sulfates are precipitated by the addition of calculated amounts of lime. Evaporation tank 86 is maintained at a temperature of 160 degrees Fahrenheit with evaporator 89 running continuously at a capacity in the preferred embodiment hereof of 80 gallons per hour. Sludge is accumulated as a dewatered cake and is oven dried to further reduce water content. This cake is accummulated and removed to a Class A landfill at periodic intervals.

Figure 5:
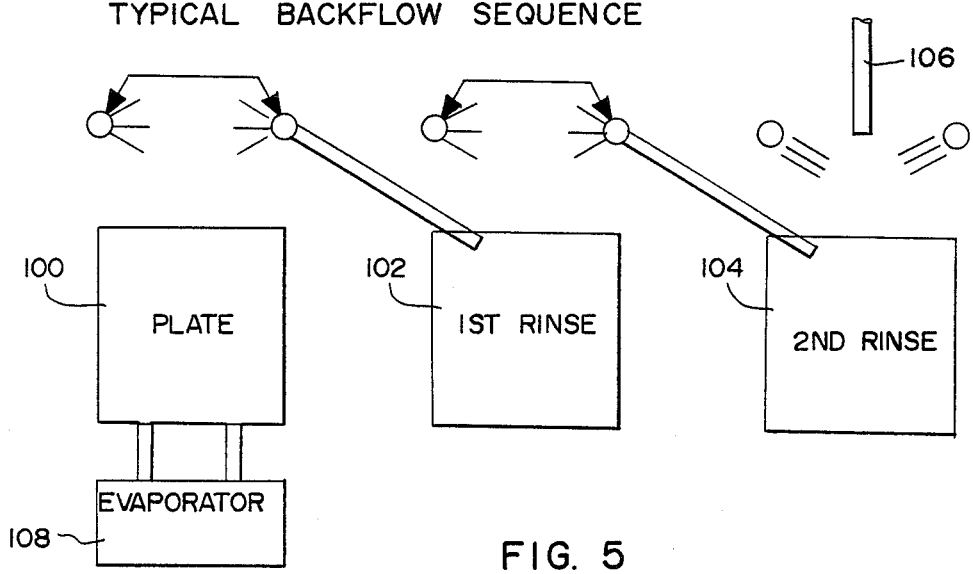
FIG. 5 is a block diagram representation of a typical backflow sequence utilized in the present invention.

FIG. 5 represents in generalized form, one of the features of the present invention. More specifically, FIG. 5 illustrates a typical backflow sequence which enables the electroplating system of the present invention to operate without the need for access to public sewers. As shown in FIG. 5, there is typically a tank devoted to the plating operation followed by a plurality of tanks devoted to rinsing operations. Thus, shown in FIG. 5 is a plating tank 100, a first rinse tank 102 and a second rinse tank 104. Second rinse tank 104 receives fresh water replenishment from a suitable source such as an overhead spray line 106 as shown in FIG. 5. The water from second rinse tank 104 is backflowed to first rinse tank 102, the water in which is backflowed into the plating tank 100. The overflow from plating tank 100 is pumped into an evaporator 108 which is designed to provide a minimum required level of evaporation of the overflow water from the plating tank as a means for disposal thereof. Except for the second rinse tank 104 which receives a pure water hoist spray from source 106, the backflow to the two preceding tanks 102 and 100 is typically provided in the form of an overhead spray of aerated water from a stationary tank source that is less contaminated than the water contained within the tank over which the spray is situated as shown in FIG. 5. In this manner, the part and the accompanying dragout adhering to each part as it is removed from a tank, are subjected to a spray rinse of water which is purer than the water in which the part has been sitting while residing in the tank.

It will now be understood that what has been disclosed herein comprises a novel and highly advantageous electroplating system which does not require access to public sewage systems for disposal of waste water. Two unique features of this system make it possible to process metal parts for electroplating through the present invention without that requirement. More specifically, one such feature involves the careful control and high efficiency use of input water by use of overhead sprays, backflows and evaporator units. The other such feature is employed in the form of a water water treatment subassembly wherein waste water for which it would not be economically feasible to provide an evaporator to dispose thereof with respect to each individual source in the plating process, is directed to an inplant sump, a neutralization sump and eventually to a unitary waste water evaporation tank which utilizes its own evaporator unit for disposing of the common waste water.

Those having skill in the art to which the present invention pertains will now perceive of various modifications and additions which can be made to the invention. By way of example, the general features disclosed herein may be used advantageously in other forms of electroplating assemblies for plating metals other than those specifically shown as examples herein. However, it will be understood that all such modifications and additions are deemed to be within the scope of the present invention which is to be limited only by the claims appended hereto.

We claim:
1. An improved electroplating system comprising:
at least one electroplating tank for plating parts;
at least one water rinse tank, said plated parts being transferred from said electroplating tank to said water rinse tank;
means for providing a source of uncontaminated water positioned adjacent said rinse tank for (1) rinsing plated parts during a removal of said plated parts from said rinse tank and (2) inserting substantially uncontaminated water into said rinse tank for reducing the contamination level of said rinse tank;
means for transferring overflow water from said rinse tank to a spray positioned above said plating tank for decreasing the contamination level of said rinse tank while removing dragout from said plated parts while they are being removed from said plating tank; and
an evaporator connected to said plating tank for receiving contaminated effluent from said plating tank for disposal of said plating tank effluent without access to public sewers.

2. An improved electroplating system of the type having a plurality of plating subsystems, each such subsystem being adapted for plating metal parts with at least one plating material, the improvement comprising:
a waste water treatment subassembly connected to each of said plating subsystem for receiving contaminated waste water therefrom, said subassembly having an evaporator for evaporating said waste water and at least one solid waste filter for removing solid wastes from said waste water, said plating subsystems including at least one plating tank, at least one rinse tank, means for providing a source of uncontaminated water for rinsing said meal parts when said metal parts are being withdrawn from said rinse tank of at least one of said plating subsystems and means for transferring overflow water form said rinse tank to a spray positioned above said plating tank for removing dragout from said metal parts and reducing the contamination level of said rinse tank, whereby no access to public sewers is needed for waste disposal.

3. The improvement recited in claim 2 further comprising:
means for neutralizing said common waste water to a pH level in the range of 7.0 to 7.5 before said waste water is applied to said evaporator.

4. The improvement recited in claim 2 further comprising:
means for heating said solid waste for accummulating a solid cake thereof.

5. An improved method for electroplating, the method comprising the following steps:
(a) providing at least one electroplating tank for plating parts;
(b) providing at least one water rinse tank in the vicinity of said electroplating tank;
(c) transferring plated parts from said electroplating tank to said rinse tank;
(d) providing a source of uncontaminated water positioned adjacent said rinse tank;
(e) rinsing said plated parts while removing said plated parts from said rinse tank;
(f) inserting substantially uncontaminated water into said rinse tank for reducing the contamination level of said rinse tank;
(g) transferring overflow water from said rinse tank to a spray above said electroplating tank for decreasing the contamination level of said rinse tank while removing dragout from said plated parts;
(h) providing an evaporator in fluid communication with said electroplating tank; and
(i) transferring contaminated effluent from said electroplating tank to said evaporator for disposal of said electroplating tank effluent without access to public sewers.

* * * * *